United States Patent
Li et al.

(10) Patent No.: US 11,356,803 B2
(45) Date of Patent: Jun. 7, 2022

(54) NAVIGATION SYSTEM AND NAVIGATION METHOD

(71) Applicant: BOE TECHNOLOGY GROUP CO., LTD., Beijing (CN)

(72) Inventors: Tao Li, Beijing (CN); Zhiguo Zhang, Beijing (CN); Hui Rao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 187 days.

(21) Appl. No.: 16/641,335

(22) PCT Filed: May 17, 2019

(86) PCT No.: PCT/CN2019/087444
§ 371 (c)(1),
(2) Date: Feb. 24, 2020

(87) PCT Pub. No.: WO2019/223621
PCT Pub. Date: Nov. 28, 2019

(65) Prior Publication Data
US 2021/0368295 A1    Nov. 25, 2021

(30) Foreign Application Priority Data
May 22, 2018 (CN) .......................... 201810496145.3

(51) Int. Cl.
*H04W 4/024* (2018.01)
*H04B 17/318* (2015.01)

(52) U.S. Cl.
CPC .......... *H04W 4/024* (2018.02); *H04B 17/318* (2015.01)

(58) Field of Classification Search
None
See application file for complete search history.

(56) References Cited

U.S. PATENT DOCUMENTS

2008/0158060 A1    7/2008   Lee et al.
2016/0205513 A1*   7/2016   Choudhry ............ G01C 21/206
                                                        455/404.2

FOREIGN PATENT DOCUMENTS

| CN | 102749613 A | 10/2012 |
| CN | 103776441 A | 5/2014 |
| CN | 204115737 U | 1/2015 |
| CN | 104501801 A | 4/2015 |

(Continued)

OTHER PUBLICATIONS

First Chinese Office Action from priority Chinese Patent Application No. 201810496145.3 dated Dec. 27, 2019.

(Continued)

*Primary Examiner* — Adolf Dsouza
(74) *Attorney, Agent, or Firm* — Dilworth & Barrese, LLP.; Michael J. Musella, Esq.

(57) ABSTRACT

The navigation system includes a plurality of first signal sources and a mobile terminal, each of the plurality of first signal sources is configured to transmit a first wireless signal; the mobile terminal is configured to receive the first wireless signal, determine a position of the mobile terminal according to the received first wireless signal, and determine a route from the position of the mobile terminal to a target first signal source to perform navigation, according to an electronic map, the received first wireless signal, the position of the mobile terminal, and the target first signal source.

16 Claims, 5 Drawing Sheets

(56) References Cited

FOREIGN PATENT DOCUMENTS

| CN | 105611500 | A | * | 5/2016 | ............... G01S 5/26 |
|----|-----------|---|---|--------|--------------------------|
| CN | 105611500 | A |   | 5/2016 |                          |
| CN | 103024665 | B |   | 9/2016 |                          |
| CN | 106154223 | A | * | 11/2016 |                         |
| CN | 106154223 | A |   | 11/2016 |                         |
| CN | 106483583 | A |   | 3/2017 |                          |
| CN | 106646361 | A |   | 5/2017 |                          |
| CN | 106651525 | A |   | 5/2017 |                          |
| CN | 107249216 | A |   | 10/2017 |                         |
| CN | 107328420 | A |   | 11/2017 |                         |
| CN | 108562869 | A |   | 9/2018 |                          |

OTHER PUBLICATIONS

"Logistics Information System and Internet of Things" May 31, 2015.
Zhaohui, "Study on Low Power Consumption Indoors Positioning based on Bluetooth 4.0", Thesis Paper, Mar. 1, 2015, pp. 1-13, Software College, Beijing China.

* cited by examiner

NAVIGATION SYSTEM AND NAVIGATION METHOD

The application claims priority to the Chinese patent application No. 201810496145.3, filed May 22, 2018, the disclosure of which is incorporated herein by reference as part of the application

TECHNICAL FIELD

Embodiments of the present disclosure relate to a navigation system and a navigation method.

BACKGROUND

At present, a positioning and navigation technology has been applied more and more widely, for example, it has important applications in fields such as ordinary commercial activities, geological exploration, scientific research, and emergency search and rescue. Wherein, when people enter buildings such as large airports, railway stations and shopping malls, a problem of how to locate a current position and find a destination in an unfamiliar large building is becoming increasingly prominent. At present, positioning and navigation may be implemented through technologies such as wireless communication.

SUMMARY

At least one embodiment of the present disclosure provides a navigation system, the navigation system comprises: a plurality of first signal sources, each of the plurality of first signal sources being configured to transmit a first wireless signal; a mobile terminal, configured to receive the first wireless signal, determine a position of the mobile terminal according to the received first wireless signal, and determine a route from the position of the mobile terminal to a target first signal source to perform navigation, according to an electronic map, the received first wireless signal, the position of the mobile terminal, and the target first signal source.

For example, in the navigation system provided by at least one embodiment of the present disclosure, the first wireless signal includes a position information of the first signal source and a power information of the first wireless signal.

For example, in the navigation system provided by at least one embodiment of the present disclosure, the first signal source transmits the first wireless signal at a predetermined time interval, and the first wireless signal further includes an ID of the first signal source.

For example, in the navigation system provided by at least one embodiment of the present disclosure, the position information of each of the plurality of first signal sources $B_i$ in the plurality of first signal sources is denoted by coordinates $(x_i, y_i, z_i)$ of the first signal sources $B_i$ in a preset spatial rectangular coordinate system; where, i is an integer greater than or equal to 1 and less than or equal to I, and I is a total number of the first signal sources corresponding to the first wireless signals received by the mobile terminal; the mobile terminal is configured to: determine a distance $R_i$ between the first signal source $B_i$ and the mobile terminal according to a signal strength of the first wireless signal of the first signal source $B_i$ which is received; determine position coordinates $(x_{01}, y_{01}, z_{01})$ of the mobile terminal in the preset spatial rectangular coordinate system according to the determined distance $R_i$ and the coordinates $(x_i, y_i, z_i)$ of the first signal source $B_i$ by using a formula below:

$$\begin{cases} (x_{01}-x_1)^2+(y_{01}-y_1)^2+(Z_{01}-Z_1)^2=R_1 \\ (x_{01}-x_2)^2+(y_{01}-y_2)^2+(Z_{01}-Z_2)^2=R_2 \\ \quad \ldots \ldots \\ (x_{01}-x_i)^2+(y_{01}-y_i)^2+(Z_{01}-Z_i)^2=R_i \\ \quad \ldots \ldots \\ (x_{01}-x_I)^2+(y_{01}-y_I)^2+(Z_{01}-Z_I)^2=R_I; \end{cases}$$

determine the position of the mobile terminal according to the determined position coordinates $(x_{01}, y_{01}, z_{01})$ and the electronic map.

For example, in the navigation system provided by at least one embodiment of the present disclosure, the mobile terminal determines the distance $R_i$ between the first signal source $B_i$ and the mobile terminal by using a formula below:

$$RSSI_i = -[10n\lg R_i + A];$$

wherein $RSSI_i$ represents signal strength of the first wireless signal received by the mobile terminal, n represents an environmental parameter, and A represents signal strength received at 1 m from the first signal source.

For example, the navigation system provided by at least one embodiment of the present disclosure further comprises at least one second wireless signal source, the second wireless signal source transmits a second wireless signal, and the mobile terminal further receives the second wireless signal transmitted by the second wireless signal source, determines an initial position of the mobile terminal according to the received second wireless signal; and determines a route from the initial position to a target region to perform navigation, according to the electronic map, the target region including the target first signal source and the determined initial position.

For example, in the navigation system provided by at least one embodiment of the present disclosure, the first wireless signal transmitted by the first signal source received by the mobile terminal is: a first wireless signal transmitted by a first signal source located in the target region and within a range of a first preset distance from the mobile terminal.

For example, in the navigation system provided by at least one embodiment of the present disclosure, the second wireless signal includes a position information of the second wireless signal source and a power information of the second wireless signal.

For example, in the navigation system provided by at least one embodiment of the present disclosure, there are a plurality of second wireless signal sources, 3 second wireless signals among a plurality of second wireless signals received by the mobile terminal are selected, and a position of a second wireless signal source $Y_k$ corresponding to the selected second wireless signal is denoted by coordinates $(x_k, y_k, z_k)$ of the second wireless signal source $Y_k$ in a preset spatial rectangular coordinate system; where, k is an integer greater than or equal to 1 and less than or equal to 3; the mobile terminal is configured to determine a distance $R_k$ between the second wireless signal source $Y_k$ and the mobile terminal, according to received signal strength $RSSI_k$ of the second wireless signal source $Y_k$ by using a formula below:

$$RSSI_k = -[10n\lg R_k + A];$$

where, n represents an environmental parameter, and A represents signal strength received at a distance of 1 m from the second wireless signal source;

determine an initial position (x02, y02, z02) of the mobile terminal according to the received coordinates (xk, yk, zk) of the second wireless signal source Yk, by using a formula below:

$$\begin{cases} x_{02} = \dfrac{\dfrac{x_1}{R_1+R_2} + \dfrac{x_2}{R_2+R_3} + \dfrac{x_2}{R_3+R_1}}{\dfrac{1}{R_1+R_2} + \dfrac{1}{R_2+R_3} + \dfrac{1}{R_3+R_1}} \\ y_{02} = \dfrac{\dfrac{y_1}{R_1+R_2} + \dfrac{y_2}{R_2+R_3} + \dfrac{y_2}{R_3+R_1}}{\dfrac{1}{R_1+R_2} + \dfrac{1}{R_2+R_3} + \dfrac{1}{R_3+R_1}} \\ z_{02} = \dfrac{\dfrac{z_1}{R_1+R_2} + \dfrac{z_2}{R_2+R_3} + \dfrac{z_2}{R_3+R_1}}{\dfrac{1}{R_1+R_2} + \dfrac{1}{R_2+R_3} + \dfrac{1}{R_3+R_1}} \end{cases}.$$

For example, in the navigation system provided by at least one embodiment of the present disclosure, the mobile terminal is configured to display a real-life picture of an environment where the target first signal source is located when being located within a range of a second preset distance from the target first signal source, and the second preset distance range is less than or equal to the first preset distance range.

For example, in the navigation system provided by at least one embodiment of the present disclosure, the mobile terminal is further configured to: acquire information of all of the first signal sources which face a camera through the camera of the mobile terminal, after the determining the position of the mobile terminal and before the determining the route; and select a target first signal source according to the information of all of the first signal sources which is acquired.

For example, in the navigation system provided by at least one embodiment of the present disclosure, the mobile terminal determines a direction of the mobile terminal according to a geomagnetic sensor and an acceleration sensor; acquires the information of all of the first signal sources which face the camera through the camera, after the camera of the mobile terminal is turned on; and selects the target first signal source according to the information of all of the first signal sources which is acquired.

At least one embodiment of the present disclosure provides a navigation method of any navigation system as mentioned above, the navigation method comprises receiving a first wireless signal transmitted by a first signal source; determining a position of a mobile terminal according to the received first wireless signal; and determining a navigation route for navigation according to an electronic map, the received first wireless signal, the position of the mobile terminal, and a target first signal source.

For example, in the navigation method provided by at least one embodiment of the present disclosure, the first wireless signal includes a position information of the first signal source and a power information of the first wireless signal.

For example, in the navigation method provided by at least one embodiment of the present disclosure, the first signal source transmits the first wireless signal at a predetermined time interval, and the first wireless signal further includes an ID of the first signal source.

For example, in the navigation method provided by at least one embodiment of the present disclosure, the position information of the first signal source Bi is denoted by coordinates (xi, yi, zi) of the first signal source Bi in a preset spatial rectangular coordinate system; where, i is an integer greater than or equal to 1 and less than or equal to I, and I is a total number of the first signal sources corresponding to the first wireless signals received by the mobile terminal; the determining the position of a mobile terminal includes: determining a distance Ri between the first signal source Bi and the mobile terminal according to a signal strength of the first signal source Bi which is received; determining position coordinates (x01, y01, z01) of the mobile terminal in the preset spatial rectangular coordinate system according to the determined distance Ri and the coordinates (xi, yi, zi) of the first signal source Bi by using a formula below:

$$\begin{cases} (x_{01}-x_1)^2 + (y_{01}-y_1)^2 + (Z_{01}-Z_1)^2 = R_1 \\ (x_{01}-x_2)^2 + (y_{01}-y_2)^2 + (Z_{01}-Z_2)^2 = R_2 \\ \quad \ldots \ldots \\ (x_{01}-x_i)^2 + (y_{01}-y_i)^2 + (Z_{01}-Z_i)^2 = R_i \\ \quad \ldots \ldots \\ (x_{01}-x_I)^2 + (y_{01}-y_I)^2 + (Z_{01}-Z_I)^2 = R_I; \end{cases}$$

determining the position of the mobile terminal according to the determined position coordinates (x01, y01, z01) and the electronic map.

For example, in the navigation method provided by at least one embodiment of the present disclosure, the determining the distance Ri between the first signal source Bi and the mobile terminal according to the signal strength of the first signal source Bi which is received includes: determining a distance Ri between each of the first signal sources Bi and the mobile terminal by using a formula below;

$RSSI_i = -[(10 n \lg R_i) + A]$;

where RSSIi represents signal strength of the first wireless signal received by the mobile terminal, n represents an environmental parameter, and A represents signal strength received at a distance of 1 m from the first signal source.

For example, the navigation method provided by at least one embodiment of the present disclosure further comprises: determining A in the formula, including: allowing a distance between the first signal source and the mobile terminal to be 1 m, controlling the first signal source to transmit a signal of a fixed power, acquiring an RSSI0 value of signal strength received by the mobile terminal; repeating the above-described step to acquire a plurality of RSSI0 values, acquiring a plurality of A0 values according to a formula $RSSI_0 = -[(10 n \lg R_o) + A_o]$; calculating an average value of the plurality of A0 values acquired, and determining the average value as the A value.

For example, the navigation method provided by at least one embodiment of the present disclosure further comprises correcting the A value, which includes: allowing the distance between the first signal source and the mobile terminal to be a plurality of test values from 2 m to 10 m, controlling the first signal source to transmit a signal of a fixed power, acquiring an RSSI value of signal strength received by the mobile terminal; determining a distance value according to the RSSI value and a formula $RSSI_k = -[(10 n \lg R_k) + A]$; comparing the distance value obtained by calculating with the test value, and if a difference between the distance value and the test value is greater than 10% of the distance value, executing a step below: allowing the distance between the first signal source and the mobile terminal to be 1 m, controlling the first signal source to transmit a signal of a fixed power, acquiring an RSSI0 value of signal strength received by the mobile terminal, repeating the above-described step to acquire a plurality of RSSI0 values, acquiring a plurality of A0 values according to a formula $RSSI_0=-[(10n\lg R_0)+A_0]$; calculating an average value of the plurality of A0 values obtained; and determining the average value as the A value; and continuing until the difference between the distance value and the test value is less than or equal to 10% of the distance value.

For example, the navigation method provided by at least one embodiment of the present disclosure further comprises displaying a real-life picture of an environment where the target first signal source is located, when navigating to located within a range of a second preset distance from the target first signal source; and navigating to a position where the target first signal source is located according to the displayed real-life picture.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
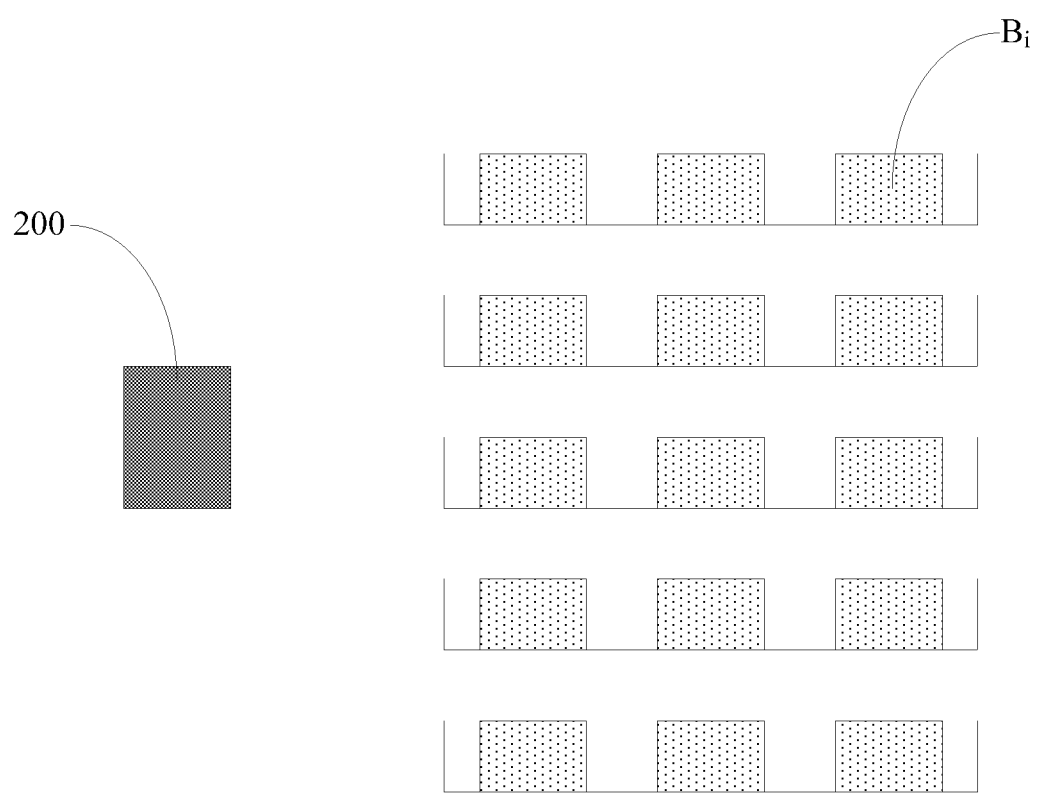
FIG. 1 is a structural schematic diagram of a navigation system provided by at least one embodiment of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/compris-ing," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

As described above, positioning and navigation may be implemented through technologies such as wireless communication. However, with respect to indoor navigation, an existing indoor positioning and navigation technology based on wireless communication has low positioning accuracy and poor anti-interference performance, which easily leads to navigation errors.

At present, for example, in an indoor shopping mall, a paper price tag is usually adopted to indicate a price of a commodity, so that price changing is inconvenient, and the price tag has to be replaced when every time the price changes, which not only causes waste of paper, but also brings certain inconvenience to selling goods. With development of a display technology, an electronic label: an electronic shelf label (ESL) that may be applied to supermarkets, convenience stores, pharmacies and shopping malls, etc., for displaying price information emerges. The electronic shelf label may be placed on a shelf, to substitute the conventional paper price tag. In addition, each electronic shelf label may be connected with a computer database through a wired or wireless network, to display latest commodity information on a display screen on the electronic shelf label.

However, when a shopping mall is relatively large with too many commodities, it is usually difficult for a consumer to find a target commodity quickly, which lowers the consumer's shopping experience.

At least one embodiment of the present disclosure provides a navigation system, the navigation system comprising a plurality of first signal sources and a mobile terminal; each first signal source being configured to transmit a first wireless signal; the mobile terminal being configured to receive the first wireless signal, determine a position of the mobile terminal according to the received first wireless signal, and determine a route from the position of the mobile terminal to a target first signal source for navigation, according to an electronic map, the received first wireless signal, the position of the mobile terminal, and the target first signal source.

Hereinafter, the navigation system and the navigation method provided by the embodiments of the present disclosure will be described through several specific embodiments.

At least one embodiment of the present disclosure provides a navigation system, which may be used for indoor positioning and navigation, for example, indoor positioning and navigation in airports, shopping malls, supermarkets and convenience stores, etc., or may also be used for outdoor positioning and navigation; and an application environment of the navigation system will not be limited in the embodiment of the present disclosure.

As shown in FIG. 1, the navigation system comprises a plurality of first signal sources $B_i$ and a mobile terminal 200; each first signal sources $B_i$ is configured to transmit a first wireless signal; the mobile terminal is configured to receive the first wireless signal, determine a position of the mobile terminal 200 according to the received first wireless signal, and determine a route from the position of the mobile terminal to a target first signal source for navigation, according to an electronic map, the received first wireless signal, the position of the mobile terminal 200, and the target first signal source.

For example, in some embodiments, a first wireless signal includes position information of a first signal source $B_i$ and power information of the wireless signal.

For example, in some embodiments, a first signal source $B_i$ transmits a first wireless signal at a predetermined time interval; for example, the first wireless signal further includes an identity (ID) of the first signal source. The ID of the first signal source may be used for identifying the identity of the first signal source, i.e., which first signal source.

For example, the first signal source $B_i$ may be an electronic label, an electronic shelf label, or the like. The first wireless signal transmitted by the first signal source $B_i$ may be a radio frequency signal, an infrared signal, a Zigbee signal, a 2.4G signal, a Wifi signal, a Bluetooth signal, a Zwave signal, or the like, wherein, the radio frequency signal may be a 433/315 radio frequency signal, or the like. Types of the first signal source $B_i$ and the first wireless signal will not be limited in the embodiment of the present disclosure, as long as corresponding functions can be implemented.

In the navigation system provided by the embodiment of the present disclosure, the first signal source transmits the first wireless signal, and the mobile terminal receives the first wireless signals transmitted by the plurality of first signal sources, and may determine the position of the mobile terminal, according to information contained in the received first wireless signal, for example, the ID, the position information, and signal strength of the received first wireless signal, so that the navigation route between the position of the mobile terminal and the target first signal source may be determined according to the electronic map, the selected target first signal source, and the determined position of the mobile terminal, so as to accurately and quickly navigate to the target first signal source.

Hereinafter, with a case where the first signal source $B_i$ is the electronic shelf label and the first wireless signal transmitted by the first signal source $B_i$ is the radio frequency signal as an example, the navigation system provided by the embodiment of the present disclosure will be exemplarily described, but this does not constitute a limitation on the present disclosure.

For example, in one embodiment, a navigation system comprises a plurality of electronic shelf labels $B_i$ and a mobile terminal 200; each electronic shelf labels $B_i$ may be configured to transmit a radio frequency signal at a predetermined time interval; wherein, the radio frequency signal may contain an ID and position information of the electronic shelf label $B_i$, as well as power information of the radio frequency signal.

The mobile terminal 200 may be configured to receive radio frequency signals transmitted by the plurality of electronic shelf labels $B_i$, determine a position of the mobile terminal 200 according to the ID and the position information included in each radio frequency signals received as well as signal strength of each radio frequency signals received; and determine a navigation route for navigation, according to an electronic map (for example, an electronic map pre-stored in the mobile terminal 200), a selected target electronic shelf label, and the position of the mobile terminal 200.

For example, the above-described navigation system may be used for indoor positioning and navigation, for example, positioning and navigation in airports, train stations, shopping malls and supermarkets; at this time, the electronic map may be an electronic map of the indoor places, for example, the airports, the train stations, the shopping malls and the supermarkets.

In this embodiment, the electronic shelf label is configured to transmit a radio frequency signal at a predetermined time interval, and the mobile terminal receives radio frequency signals transmitted by the plurality of electronic shelf labels, to determine the position of the mobile terminal according to the ID and the position information contained in the respective radio frequency signal received, as well as the signal strength of the respective radio frequency signal received. Usually, the buildings such as the airports, the railway stations and the shopping malls will be provided with supermarkets and convenience stores, etc., that is, equipped with more electronic shelf labels; and when a person is located in the above-described buildings, he/she may use a mobile terminal to implement accurate and fast real-time positioning according to the radio frequency signals transmitted by the electronic shelf labels. Thus, the navigation route between the position of the mobile terminal and the target electronic shelf label may be determined according to, for example, the pre-stored indoor electronic map, the target electronic shelf label corresponding to a selected target commodity, and the determined position of the mobile terminal, so as to accurately navigate to the target electronic shelf label, to further quickly find the target commodity.

Figure 2A:
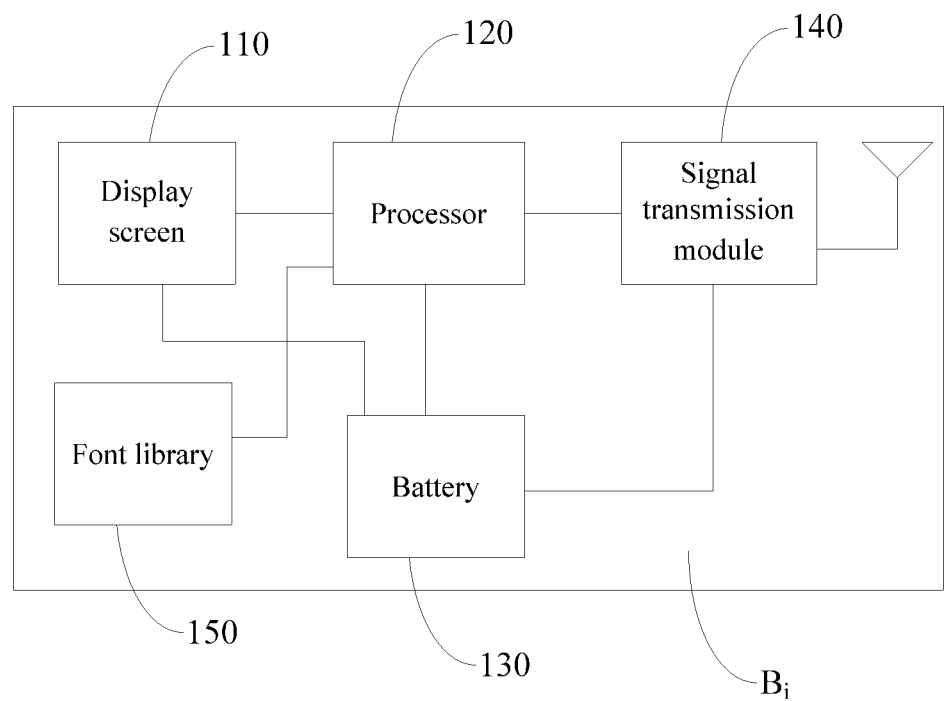
FIG. 2*a* is a structural schematic diagram of a first signal source provided by at least one embodiment of the present disclosure.

For example, in some embodiments, as shown in FIG. 2a, an electronic shelf label $B_i$ may include: a display screen 110, a processor 120, a battery 130, a signal transmission module (e.g., a radio frequency transmission module) 140 and a font library 150. The battery 130 is configured to provide a required voltage to the display screen 110, the processor 120 and the signal transmission module 140. The processor 120 is configured to be connected with a computer database according to a wired or wireless network, and display latest commodity information on the display screen 110 by calling a font in the font library 150. For example, the commodity information may include: one or a combination of price, type, serial number, production date, shelf life, and place of origin of the commodity. Of course, the commodity information may further include other commodity-related information, which will not be limited here.

For example, the processor 120 is further configured to control the signal transmission module 140 to transmit a radio frequency signal at a predetermined time interval. The radio frequency signal may contain an ID and position information of the electronic shelf label, as well as power information of the radio frequency signal. The ID of the electronic shelf label includes commodity information. For example, the signal transmission module 140 may include: a 2.4 Ghz RF transceiver receiver module (a 2.4G wireless module). Of course, the signal transmission module 140 may further include other type of electron device that may transmit a signal, which will not be limited here.

Figure 2B:
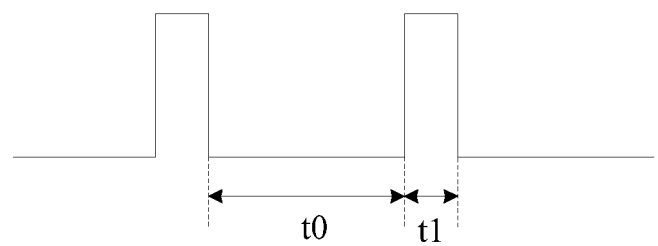
FIG. 2*b* is a time sequence diagram of a first signal source transmitting a first wireless signal provided by at least one embodiment of the present disclosure.

For example, FIG. 2b shows a time sequence diagram of transmitting a radio frequency signal, where, t0 represents a preset time period and t1 represents a slot time period for transmitting the radio frequency signal. The preset time period is generally on an order of milliseconds, for example, 5 ms, 10 ms or 15 ms, etc. The slot time period may be shorter than the preset time period, and may be, for example, 1 ms, 2 ms or 3 ms, etc. For example, in the preset time period, the electronic shelf label may also receive information transmitted by the mobile terminal to acquire a signal, so that the electronic shelf label may interact with the mobile terminal.

For example, in some embodiments, position information of an electronic shelf label $B_i$ is denoted by coordinates ($x_i$, $y_i$, $z_i$) of the electronic shelf label $B_i$ in a preset spatial rectangular coordinate system; where, i is an integer greater than or equal to 1 and less than or equal to I, and I is the total number of electronic shelf labels corresponding to radio frequency signals received by a mobile terminal.

Figure 3:
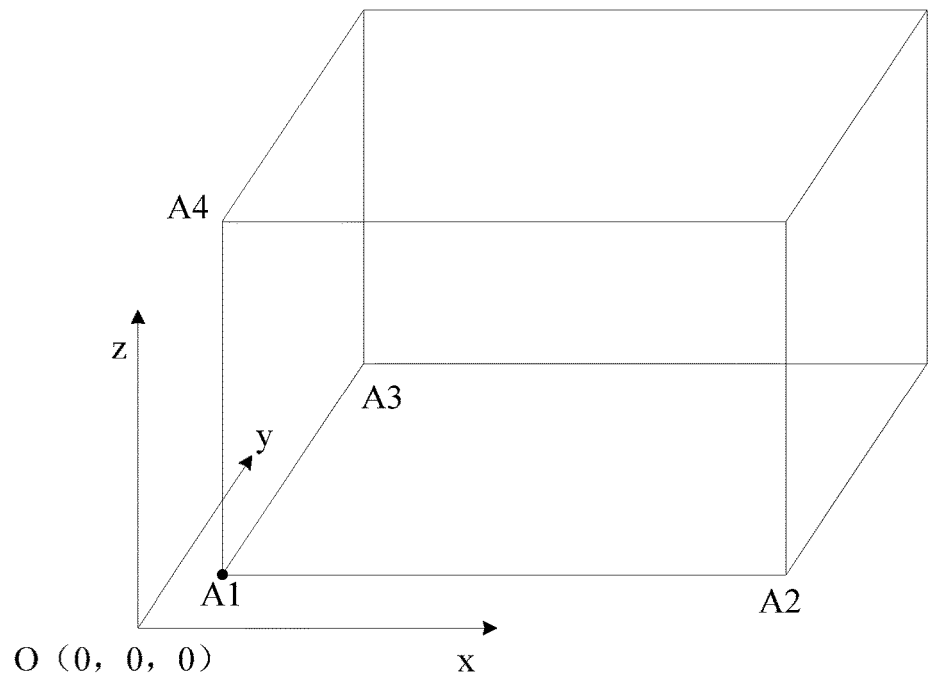
FIG. 3 is a schematic diagram of establishing a spatial rectangular coordinate system provided by at least one embodiment of the present disclosure.

For example, in some examples, the preset spatial rectangular coordinate system may be established based on the building where the electronic shelf label is located. For example, when the building is a shopping mall, as shown in FIG. 3, a vertex angle A1 of a corner of the shopping mall may be taken as an origin O (0, 0, 0) of the preset spatial rectangular coordinate system, an A1-A2 direction may be taken as an x-axis of the preset spatial rectangular coordinate system, an A1-A3 direction may be taken as a y-axis of the preset spatial rectangular coordinate system, and an A1-A4 direction may be taken as a z-axis of the preset spatial rectangular coordinate system. Of course, the preset spatial rectangular coordinate system may also be established by other means, which will not be limited here.

Hereinafter, it will be described with the preset spatial rectangular coordinate system established in the mode shown in FIG. 3 as an example, but this does not constitute a limitation on the present disclosure.

In some embodiments, a mobile terminal is configured to determine a distance $R_i$ between an electronic shelf label $B_i$ and the mobile terminal according to received signal strength of the electronic shelf label $B_i$.

For example, position coordinates ($x_{01}$, $y_{01}$, $z_{01}$) of the mobile terminal in a preset spatial rectangular coordinate system are determined according to the determined distance $R_i$ and coordinates ($x_i$, $y_i$, $z_i$) of respective electronic shelf labels $B_i$ by using a formula below;

$$\begin{cases} (x_{01}-x_1)^2 + (y_{01}-y_1)^2 + (Z_{01}-Z_1)^2 = R_1 \\ (x_{01}-x_2)^2 + (y_{01}-y_2)^2 + (Z_{01}-Z_2)^2 = R_2 \\ \quad \cdots \cdots \\ (x_{01}-x_i)^2 + (y_{01}-y_i)^2 + (Z_{01}-Z_i)^2 = R_i \\ \quad \cdots \cdots \\ (x_{01}-x_I)^2 + (y_{01}-y_I)^2 + (Z_{01}-Z_I)^2 = R_I; \end{cases}$$

For example, a position of the mobile terminal (e.g., a real-time position of the mobile terminal) is determined according to the determined position coordinates ($x_{01}$, $y_{01}$, $z_{01}$) and an electronic map (e.g., an electronic map pre-stored in the mobile terminal). For example, when the mobile terminal is located in a shopping mall, the electronic map may be an indoor electronic map of the shopping mall, which may be obtained by downloading an application (APP) of the shopping mall.

For example, a distance between an object transmitting a signal and an object receiving the signal may be determined according to signal strength of a power signal. For example, in some embodiments, a mobile terminal may be configured to determine a distance $R_i$ between an electronic shelf label $B_i$ and the mobile terminal by using a formula below;

$$RSSI_i = -[(10 n \lg R_i) + A];$$

Where, $RSSI_i$, represents signal strength of a radio frequency signal received by the mobile terminal, n represents an environmental parameter, and A represents signal strength received at 1 m from the electronic shelf label $B_i$. Specifically, n may be the same as the environmental parameter n in the related art, and no details will be repeated here. For example, a numerical value of n is related to a signal transmission speed of an environment where the electronic shelf label $B_i$ is located, and the numerical value thereof is affected by objects (e.g., walls and shelves, etc.) that block signal transmission in the environment, so n has different numerical values in different environments. For example, in some embodiments, a value of n is about 2 or 3, etc.

For example, a method for determining a numerical value of A may be: allowing the distance between the object transmitting the signal (e.g., the first signal source, the electronic shelf label $B_i$) and the object receiving the signal (e.g., the mobile terminal) to be 1 m, controlling the object transmitting the signal to transmit a signal of a fixed power, and acquiring signal strength received by the object receiving the signal, that is, an $RSSI_0$ value. A plurality of RSSI values are acquired by repeating the above-described step; a plurality of $A_0$ values may be obtained according to a formula $RSSI_0 = -[(10 n \lg R_0) + A_0]$, where $R_0 = 1$ m, calculating an average value of the plurality of $A_0$ values obtained, and taking the average value as the A value, which is substituted into $RSSI_i = -[(10 n \lg R_i) + A]$.

For example, in order to make a relationship between A and $RSSI_i$, more accurate, in an indoor environment, when the distance between the object transmitting the signal (e.g., the first signal source, the electronic shelf label $B_i$) and the object receiving the signal (e.g., the mobile terminal) is 1 m, signal strength received by the object receiving the signal may also be acquired many times, and an average value of the acquired signal strengths is calculated and taken as an RSSI value actually detected; thereafter, when the distance between the object transmitting the signal and the object receiving the signal is 2 m, signal strength received by the object receiving the signal may be acquired many times again, and an average value of the acquired signal strengths is calculated and taken as an RSSI value actually detected; so on and so forth, when the distance between the object transmitting the signal and the object receiving the signal is respectively 3 m, 4 m, 5 m, 6 m, 7 m, 8 m, 9 m and 10 m, the above-described step is repeated and no details will be repeated here, so that 10 RSSI values actually detected may be obtained; and further, a curve is drawn according to the distances and the RSSI values actually detected, to further determine whether the formula $RSSI_i = -[(10 n \lg R_i) + A]$ is accurate. If it is accurate, then the distances $R_i$ between the respective electronic shelf labels $B_i$ and the mobile terminal are determined by using the formula. If it is not accurate, the above-described method for determining the A value is repeated until it is accurate.

Generally speaking, a wireless signal (e.g., a radio frequency signal) will decrease in signal strength as a transmission distance increases, so the mobile terminal at an entrance of the shopping mall may fail to receive the radio frequency signal transmitted by the electronic shelf label. Therefore, in order to find a target commodity conveniently, for example, in some embodiments, a navigation system may further comprise at least one second wireless signal source. The second wireless signal source may transmit a second wireless signal; and a mobile terminal may also receive the second wireless signal transmitted by the second wireless signal source, determine an initial position of the mobile terminal according to the received second wireless signal; and determine a route from the initial position to the target region for navigation, according to an electronic map, a target region including a target first signal source and the determined initial position. For example, the target region may be a region where the target commodity is located, so that the target region may be reached through the navigation route.

For example, in the above-described case, a first wireless signal transmitted by a first signal source which is received by the mobile terminal is a first wireless signal transmitted by a first signal source located in the target region and within a range of a first preset distance from the mobile terminal.

For example, the second wireless signal includes position information of the second wireless signal source and power information of the second wireless signal. The second wireless signal may be, for example, a radio frequency signal, an infrared signal, a Zigbee signal, a 2.4G signal, a Wifi signal, a Bluetooth signal, a Zwave signal, or the like, wherein the radio frequency signal may be a 433/315 radio frequency signal, or the like, which will not be limited in the embodiment of the present disclosure.

Generally speaking, signal strength attenuates monotonically as the transmission distance increases; when a distance is within 10 m from a signal source, signal strength received by a receiver will decline; and when a distance to an emitter is greater than 10 m, signal strength received by the receiver tends to be flat, that is, changes little. Therefore, the first preset distance may be set to 10 m, and a first preset distance range is a circle with a radius of 10 m. Of course, the first preset distance may also be other distance less than 10 m or greater than 10 m, which will not be limited here.

A working mode of iBeacon is that: an apparatus with Bluetooth low energy (BLE) communication function transmits its own unique ID to surroundings by using a BLE technology, and an APP receiving the ID will take some actions according to the ID. For example, if an iBeacon communication module is set up in a store, an information which may be run on an iPhone and an iPad may be notified a server, or a server may transmit discount coupons and store points to customers. In addition, the iBeacon may also be configured to transmit information to the APP when a household electrical appliance fails or stops working. Therefore, for example, in some embodiments, a second wireless signal source may include: an iBeacon communication module.

For example, in some embodiments, 3 second wireless signals among a plurality of second wireless signals received by a mobile terminal are selected, and a position of a second wireless signal source $Y_k$ corresponding to a selected second wireless signal is denoted by coordinates $(x_k, y_k, z_k)$ of the second wireless signal source $Y_k$ in a preset spatial rectangular coordinate system; where, k is an integer greater than or equal to 1 and less than or equal to 3. For example, the selected 3 second wireless signal sources $Y_k$ are selected on a centroid algorithm principle, and distances thereof to the mobile terminal are equal to each other.

For example, the mobile terminal is configured to determine a distance $R_k$ between the second wireless signal source $Y_k$ and the mobile terminal, according to received signal strength $RSSI_k$ of the second wireless signal source $Y_k$ by using a formula below;

$$RSSI_k = -[(10nlgR_k)+A];$$

Where, n represents an environmental parameter, and A represents signal strength received at a distance of 1 m from the second wireless signal source. For description of the environment parameter n, the above-described embodiment may be referred to, and no details will be repeated here.

For example, an initial position $(x_{02}, y_{02}, z_{02})$ of the mobile terminal is determined according to the received coordinates $(x_k, y_k, z_k)$ of the second wireless signal source $Y_k$, by using a formula below;

$$\begin{cases} x_{02} = \dfrac{\dfrac{x_1}{R_1+R_2} + \dfrac{x_2}{R_2+R_3} + \dfrac{x_2}{R_3+R_1}}{\dfrac{1}{R_1+R_2} + \dfrac{1}{R_2+R_3} + \dfrac{1}{R_3+R_1}} \\[2mm] y_{02} = \dfrac{\dfrac{y_1}{R_1+R_2} + \dfrac{y_2}{R_2+R_3} + \dfrac{y_2}{R_3+R_1}}{\dfrac{1}{R_1+R_2} + \dfrac{1}{R_2+R_3} + \dfrac{1}{R_3+R_1}} \\[2mm] z_{02} = \dfrac{\dfrac{z_1}{R_1+R_2} + \dfrac{z_2}{R_2+R_3} + \dfrac{z_2}{R_3+R_1}}{\dfrac{1}{R_1+R_2} + \dfrac{1}{R_2+R_3} + \dfrac{1}{R_3+R_1}}. \end{cases}$$

It should be noted that, a method for acquiring A in the formula $RSSI_k=-[(10nlgR_k)+A]$ is the same as the method for acquiring A in the formula $RSSI_i=-[(10nlgR_i)+A]$, and no details will be repeated here.

For example, in some embodiments, a mobile terminal is configured to start navigation according to an electronic map, a selected target electronic shelf label, and a determined position of the mobile terminal; for example, display a pre-stored realistic picture of an environment where the target electronic shelf label is located (for example, a periphery of a shelf) when being navigated to a range of a second preset distance from the target electronic shelf label; and being navigated to a position where the target electronic shelf label is located according to the displayed realistic picture.

At this time, after being navigated to a shorter distance from a target commodity, a realistic picture of the target commodity may be popped up in advance so that a customer may easily find the shelf where the target commodity is located through the realistic picture, and further quickly find the target commodity. For example, a second preset distance range is less than or equal to a first preset distance range. For example, the second preset distance may be 5 m, 7 m, 9 m or 10 m; and the second preset distance range is a circle with a radius of 5 m, 7 m, 9 m or 10 m. Of course, the second preset distance may be designed and determined according to an actual application environment, which will not be limited here.

For example, a camera is provided in the mobile terminal, and photos may be taken through the camera, or a scene opposite to the camera may be obtained through scanning by the camera. For example, in some embodiments, a mobile terminal may also acquire information of an electronic shelf label facing the camera through a camera of the mobile terminal after determining a position of the mobile terminal and before determining a navigation route; and select a target electronic shelf label according to all the electronic shelf label information acquired.

For example, the mobile terminal may determine a direction of the mobile terminal according to a geomagnetic sensor and an acceleration sensor; acquire information on all electronic shelf labels which face the camera, for example, commodity information and an image, through the camera, after the camera of the mobile terminal is turned on; and select the target electronic shelf label according to all the electronic shelf label information acquired.

At this time, information on a more distant electronic shelf label, for example, commodity information and an image, may be obtained through the camera, so that a situation of the more distant electronic shelf label may be obtained by watching the image while staying still; if the target commodity is in the image, a position of the target commodity may be quickly found through the image. If the target commodity is not in the image, the camera may be aimed at other position to obtain commodity information and an image on the electronic shelf label. For example, the geomagnetic sensor and the acceleration sensor are preset in the mobile terminal. In addition, the camera may be turned on through an APP, or may also be directly turned on manually, which will not be limited here.

For example, in some embodiments, a mobile terminal may include a mobile phone, a tablet personal computer, a laptop, a navigator, and any other product or component having a display function, for example, an APP of a building where a commodity is located is set in these products or components. For example, when the building is a shopping mall, the mobile terminal may be a mobile phone, and an APP of the shopping mall is downloaded to the mobile phone.

Alternatively, another navigation system provided by an embodiment of the present disclosure may comprise a plurality of first signal sources, a mobile terminal, a first terminal and a second mobile terminal. Each first signal source is configured to transmit a wireless signal; the first terminal is configured to receive the wireless signal, determine a position of the mobile terminal according to the received wireless signal, determine a route from the position of the mobile terminal to a target first signal source, according to an electronic map, the received wireless signal, the position of the mobile terminal and the target first signal source, and transmit the route to the second mobile terminal; and the second mobile terminal accepts the route for navigation.

For example, the first terminal may be a server or a fixed electronic apparatus installed in a building such as a shopping mall, which may increase a data calculation speed, etc.; and the second mobile terminal may accept the route transmitted by the first terminal as well as a matching APP and the electronic map to navigate for a user, so that route navigation may be performed through cooperation of the first terminal and the second mobile terminal, without being limited by hardware such as a memory and a processor of the mobile terminal. Therefore, by using the first terminal, an operation speed may be increased to provide the user with a better application experience.

Figure 4:
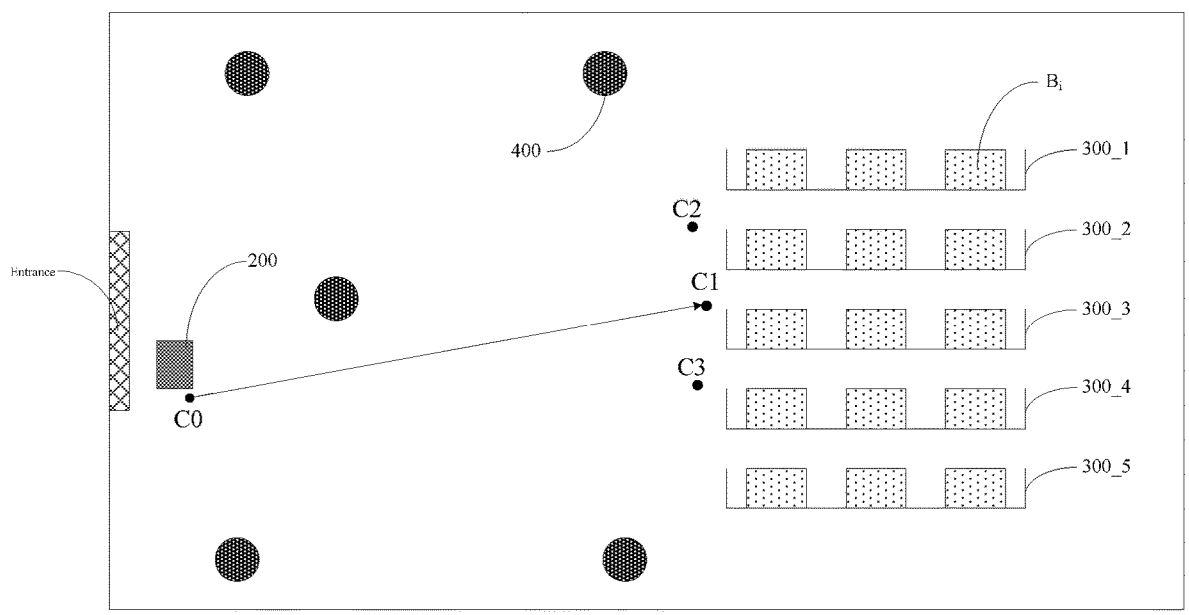
FIG. 4 is a structural schematic diagram of a navigation system in a shopping mall provided by at least one embodiment of the present disclosure.

Hereinafter, a working process of the navigation system provided by the embodiment of the present disclosure will be described in detail in conjunction with FIG. 4 and specific embodiments. In this embodiment, it is described with a case where the building is a shopping mall, the mobile terminal is a mobile phone downloaded with the shopping mall APP, and the first signal source is an electronic shelf label $B_i$ set on a shelf $300\_e$ (e=1, 2, 3, 4, 5) as an example, but this does not constitute a limitation on the present disclosure.

For example, iBeacon communication modules 400 are arranged at an entrance and respective corners of the shopping mall where there is no electronic shelf label $B_i$; when a customer enters from the entrance, an APP of a mobile phone 200 may be opened, to receive second wireless signals transmitted by a plurality of iBeacon communication modules 400; 3 second wireless signals among the plurality of second wireless signals received by the mobile phone 200 are selected; second wireless signal sources corresponding to the 3 second wireless signals are respectively: $Y_1, Y_2, Y_3$; and coordinates of the 3 second wireless signal sources $Y_k$ in a preset spatial rectangular coordinate system are respectively: $Y_1(x_1, y_1, z_1), Y_2(x_2, y_2, z_2), Y_3(x_3, y_3, z_3)$. According to a formula: $RSSI_k=-[(10\mathrm{lg}R_k)+A]$ distances $R_1, R_2, R_3$ respectively between the second wireless signal sources $Y_1, Y_2, Y_3$ and the mobile phone 200 may be determined. According to a formula below, initial position coordinates $(x_{02}, y_{02}, z_{02})$ of the mobile phone 200 may be determined:

$$\begin{cases} x_{02} = \dfrac{\dfrac{x_1}{R_1+R_2} + \dfrac{x_2}{R_2+R_3} + \dfrac{x_2}{R_3+R_1}}{\dfrac{1}{R_1+R_2} + \dfrac{1}{R_2+R_3} + \dfrac{1}{R_3+R_1}} \\ y_{02} = \dfrac{\dfrac{y_1}{R_1+R_2} + \dfrac{y_2}{R_2+R_3} + \dfrac{y_2}{R_3+R_1}}{\dfrac{1}{R_1+R_2} + \dfrac{1}{R_2+R_3} + \dfrac{1}{R_3+R_1}} \\ z_{02} = \dfrac{\dfrac{z_1}{R_1+R_2} + \dfrac{z_2}{R_2+R_3} + \dfrac{z_2}{R_3+R_1}}{\dfrac{1}{R_1+R_2} + \dfrac{1}{R_2+R_3} + \dfrac{1}{R_3+R_1}} . \end{cases}$$

Therefore, a position in the electronic map where the mobile phone 200 is located is determined according to the pre-stored electronic map. If a target commodity selected by the customer is set on the shelf 300_3, that is, the customer wants to go from point C0 to point C1, at this time, a region where point C1 is located may be taken as a target region, so that a navigation route may be determined for navigation according to the pre-stored electronic map, the target region where the selected target commodity is located and the determined initial position C0.

In some examples, due to an error of the iBeacon itself, the customer may be taken to point C2 or point C3 after navigation, for example, the customer may be taken to point C2, at this time, electronic shelf labels $B_i$ on the shelves 300_1 and 300_2 are closer to the mobile phone 200, so that the mobile phone 200 receives radio frequency signals with stronger signal strength transmitted by the electronic shelf labels $B_i$ set on the shelves 300_1 and 300_2. In order to reduce the error, the mobile phone 200 determines a distance $R_i$ between the electronic shelf label $B_i$ and the mobile phone 200 according to position information contained in the radio frequency signal emitted by the electronic shelf label $B_i$ within 10 m from it, and according to a formula $RSSI_i=-[(10\mathrm{lg}R_i)+A]$. Then, the position coordinates $(x_{01}, y_{01}, z_{01})$ of the mobile phone 200 in the preset spatial rectangular coordinate system are determined by using a formula below:

$$\begin{cases} (x_{01}-x_1)^2 + (y_{01}-y_1)^2 + (Z_{01}-Z_1)^2 = R_1 \\ (x_{01}-x_2)^2 + (y_{01}-y_2)^2 + (Z_{01}-Z_2)^2 = R_2 \\ \quad \cdots\cdots \\ (x_{01}-x_i)^2 + (y_{01}-y_i)^2 + (Z_{01}-Z_i)^2 = R_i \\ \quad \cdots\cdots \\ (x_{01}-x_I)^2 + (y_{01}-y_I)^2 + (Z_{01}-Z_I)^2 = R_I. \end{cases}$$

Next, the position in the electronic map where the mobile phone 200 is located may be accurately determined according to the pre-stored electronic map.

Thereafter, the navigation route may be determined for navigation according to the pre-stored electronic map, the selected target electronic shelf label, and the determined position of the mobile phone 200, so that the customer may quickly find the target commodity.

For example, in some embodiments, navigation may also be started according to an electronic map, a selected target electronic shelf label, and a determined position of a mobile phone 200; after being navigated to reach a region within a range of 5 m from the target electronic shelf label, a pre-stored real-life picture of an environment of the target electronic shelf label (for example, a periphery of a shelf) is displayed, and thus, a customer may be guided to quickly find a target commodity through subjective scanning according to the displayed real-life picture.

For example, in some embodiments, a direction of a mobile phone may also be determined according to a geomagnetic sensor and an acceleration sensor in the mobile phone; after a camera of the mobile phone is turned on, information on all electronic shelf labels which face the camera, for example, commodity information and an image, is acquired through the camera; and a target electronic shelf label corresponding to a target commodity may be quickly found by selecting according to serial numbers and images of all the electronic shelf labels acquired. If there is no target commodity in the image, the camera is aimed at other position to obtain commodity information and an image on the electronic shelf label.

Based on a same inventive concept, at least one embodiment of the present disclosure further provides a navigation method by using any one of the above-described navigation systems. A principle on which the navigation method solves the problem is similar to that of the foregoing navigation device, and thus, for an implementation mode of the navigation method, the foregoing embodiment of the navigation device may be referred to, and no details will be repeated here.

Figure 5:
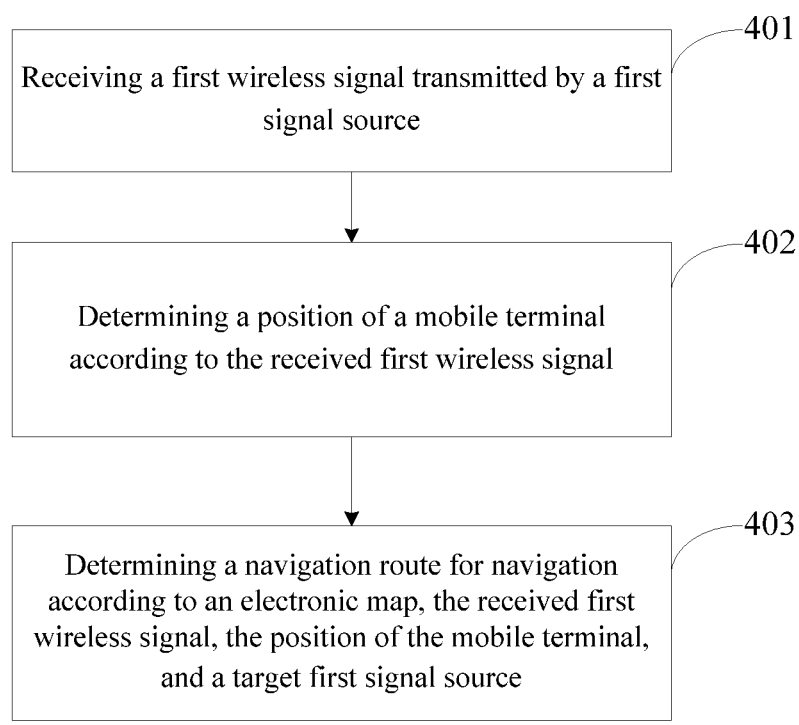
FIG. 5 is a flow chart of a navigation method provided by at least one embodiment of the present disclosure.

A navigation method provided by at least one embodiment of the present disclosure, as shown in FIG. 5, may comprise steps 401 to 403.

Step 401: receiving a first wireless signal transmitted by a first signal source.

Step 402: determining a position of a mobile terminal according to the received first wireless signal.

Step 403: determining a navigation route for navigation according to an electronic map, the received first wireless signal, the position of the mobile terminal, and a target first signal source.

For example, as described above, the first wireless signal includes position information of the first signal source and power information of the first wireless signal. For example, in some embodiments, a first signal source transmits a first wireless signal at a predetermined time interval; and the first wireless signal further includes an ID of the first signal source.

Figure 6:
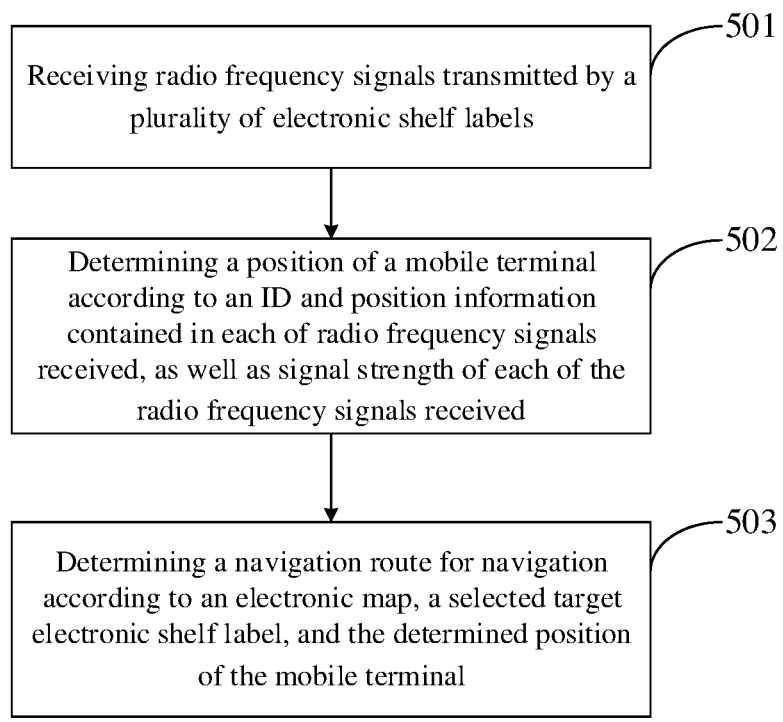
FIG. 6 is a flow chart of another navigation method provided by at least one embodiment of the present disclosure.

For example, in one embodiment, a first signal source is an electronic shelf label, and a first wireless signal is a radio frequency signal; at this time, as shown in FIG. 6, a navigation method may comprise steps 501 to 503.

Step 501: receiving radio frequency signals transmitted by a plurality of electronic shelf labels; for example, the radio frequency signal is transmitted by each of the plurality of electronic shelf labels at a predetermined time interval;

Step 502: determining a position of a mobile terminal according to an ID and position information contained in each of the radio frequency signals received, as well as signal strength of each of the radio frequency signals received;

Step 503: determining a navigation route to perform navigation according to an electronic map, a selected target electronic shelf label, and the determined position of the mobile terminal.

In the above-described navigation method, the electronic shelf label transmits a radio frequency signal at a predetermined time interval, and radio frequency signals transmitted by a plurality of electronic shelf labels are received, so that the position of the mobile terminal may be determined according to the ID and the position information contained in each of the radio frequency signals received, as well as the signal strength of each of the radio frequency signals received. Therefore, the navigation route between the position of the mobile terminal and the target electronic shelf label may be determined according to the electronic map, the target electronic shelf label corresponding to a selected target commodity, and the determined position of the mobile terminal, so as to accurately navigate to the target electronic shelf label, to further quickly find the target commodity.

For example, in some embodiments, position information of an electronic shelf label $B_i$ is denoted by coordinates ($x_i$, $y_i$, $z_i$) of the electronic shelf label $B_i$ in a preset spatial rectangular coordinate system; where, i is an integer greater than or equal to 1 and less than or equal to I, and I is the total number of electronic shelf labels corresponding to radio frequency signals received by a mobile terminal.

For example, in some embodiments, the determining a position of a mobile terminal may specifically include:

Determining a distance $R_i$ between an electronic shelf label $B_i$ and the mobile terminal according to received signal strength of the electronic shelf label $B_i$;

Determining position coordinates ($x_{01}$, $y_{01}$, $z_{01}$) of the mobile terminal in a preset spatial rectangular coordinate system according to the determined distance $R_i$ and coordinates ($x_i$, $y_i$, $z_i$) of each of the electronic shelf labels $B_i$ by using a formula below;

$$\begin{cases} (x_{01}-x_1)^2 + (y_{01}-y_1)^2 + (Z_{01}-Z_1)^2 = R_1 \\ (x_{01}-x_2)^2 + (y_{01}-y_2)^2 + (Z_{01}-Z_2)^2 = R_2 \\ \quad \cdots \cdots \\ (x_{01}-x_i)^2 + (y_{01}-y_i)^2 + (Z_{01}-Z_i)^2 = R_i \\ \quad \cdots \cdots \\ (x_{01}-x_I)^2 + (y_{01}-y_I)^2 + (Z_{01}-Z_I)^2 = R_I; \end{cases}$$

Determining the position of the mobile terminal according to the determined position coordinates ($x_{01}$, $y_{01}$, $z_{01}$) and an electronic map.

For example, in some embodiments, the determining a distance $R_i$ between an electronic shelf label $B_i$ and the mobile terminal may include: determining the distance $R_i$ between the electronic shelf label $B_i$ and the mobile terminal by using a formula below;

$$RSSI_i = -[(10n \lg R_i) + A];$$

Where, $RSSI_i$, represents signal strength of a radio frequency signal received by the mobile terminal, n represents an environmental parameter, and A represents signal strength received at 1 m from the electronic shelf label $B_i$.

For example, in some embodiments, a navigation method further comprises: determining A in the above-described formula, including: allowing a distance between a first signal source and a mobile terminal to be 1 m, controlling the first signal source to transmit a signal of a fixed power, acquiring an $RSSI_0$ value of signal strength received by the mobile terminal, repeating the above-described step to acquire a plurality of $RSSI_0$ values, acquiring a plurality of $A_0$ values according to a formula $RSSI_0=-[(10nlgR_0)+A_0]$; calculating an average value of the plurality of $A_0$ values acquired, and determining the average value as the A value.

For example, in some embodiments, a navigation method further comprises: correcting an acquired A value, including: allowing a distance between a first signal source and a mobile terminal to be a plurality of test values from 2 m to 10 m, controlling the first signal source to transmit a signal of a fixed power, acquiring an RSSI value of signal strength received by the mobile terminal; determining a distance value according to the RSSI value and a formula $RSSI_k=-[(10nlgR_k)+A]$; comparing the distance value obtained by calculating with a test value, and if a difference between the distance value and the test value is greater than 10% of the distance value, executing a step below: allowing the distance between the first signal source and the mobile terminal to be 1 m, controlling the first signal source to transmit a signal of a fixed power, acquiring an $RSSI_0$ value of signal strength received by the mobile terminal, repeating the above-described step to acquire a plurality of $RSSI_0$ values, acquiring a plurality of $A_0$ values according to a formula $RSSI_0=-[(10nlgR_0)+A_0]$; calculating an average value of the plurality of $A_0$ values obtained, determining the average value as the A value; and continuing until the difference between the distance value and the test value is less than or equal to 10% of the distance value.

For example, in some embodiments, an indoor positioning and navigation method may further comprise:

Receiving second wireless signals transmitted by a plurality of second wireless signal sources;

Determining an initial position of a mobile terminal according to a received position of a second wireless signal source and received signal strength of a second wireless signal source;

Determining a navigation route to perform navigation, according to an electronic map, a selected target region, and the determined initial position.

For example, the receiving radio frequency signals transmitted by a plurality of electronic shelf labels may specifically include: receiving radio frequency signals transmitted by electronic shelf labels located in a target region and within a range of a first preset distance from the mobile terminal.

For example, in some embodiments, the determining an initial position of a mobile terminal may specifically include:

Determining a distance $R_k$ between the wireless signal source $Y_k$ and the mobile terminal, according to received signal strength $RSSI_k$ of a second wireless signal source $Y_k$ by using a formula below;

$$RSSI_k=-[(10nlgR_k)+A];$$

Where, n represents an environmental parameter, and A represents signal strength received at a distance of 1 m from the second wireless signal source;

Determining the initial position $(x_{02}, y_{02}, z_{02})$ of the mobile terminal according to received coordinates $(x_k, y_k, z_k)$ of the second wireless signal source $Y_k$, by using a formula below;

$$\begin{cases} x_{02} = \dfrac{\dfrac{x_1}{R_1+R_2}+\dfrac{x_2}{R_2+R_3}+\dfrac{x_2}{R_3+R_1}}{\dfrac{1}{R_1+R_2}+\dfrac{1}{R_2+R_3}+\dfrac{1}{R_3+R_1}} \\ y_{02} = \dfrac{\dfrac{y_1}{R_1+R_2}+\dfrac{y_2}{R_2+R_3}+\dfrac{y_2}{R_3+R_1}}{\dfrac{1}{R_1+R_2}+\dfrac{1}{R_2+R_3}+\dfrac{1}{R_3+R_1}} \\ z_{02} = \dfrac{\dfrac{z_1}{R_1+R_2}+\dfrac{z_2}{R_2+R_3}+\dfrac{z_2}{R_3+R_1}}{\dfrac{1}{R_1+R_2}+\dfrac{1}{R_2+R_3}+\dfrac{1}{R_3+R_1}} \end{cases}$$

For example, in some embodiments, the determining a navigation route to perform navigation, according to an electronic map, a selected target electronic shelf label, and the determined position of the mobile terminal may specifically include:

Starting navigation according to the electronic map, the selected target electronic shelf label, and the determined position of the mobile terminal;

Displaying a real-life picture of an environment where the target electronic shelf label is located (for example, a periphery of a shelf), when navigating to a range of a second preset distance from the target electronic shelf label;

Navigating to the position where the target electronic shelf label is located according to the displayed real-life picture.

For example, in some embodiments, after the determining a position of a mobile terminal, and before the determining a navigation route, the navigation method may further comprise:

Determining a direction of the mobile terminal according to a geomagnetic sensor and an acceleration sensor;

Acquiring information on all electronic shelf labels which face a camera, for example, commodity information and an image, through the camera, after the camera of the mobile terminal is turned on;

Selecting the target electronic shelf label according to the information of all electronic shelf labels acquired, for example, a serial number and an image of a commodity. In the navigation system and the navigation method provided by the embodiments of the present disclosure, the electronic shelf label is configured to transmit a radio frequency signal at a predetermined time interval, and the mobile terminal receives radio frequency signals transmitted by the plurality of electronic shelf labels, to determine the position of the mobile terminal according to the ID and the position information contained in each of the radio frequency signals received as well as the signal strength of the respective radio frequency signal received. Usually, the buildings such as the airports, the railway stations and the shopping malls will be provided with supermarkets and convenience stores, etc., that is, equipped with more electronic shelf labels; and when a person is located in the above-described buildings, he/she may use a mobile terminal to implement accurate real-time positioning according to the radio frequency signals transmitted by the electronic shelf labels. Thus, the navigation route between the position of the mobile terminal and the target electronic shelf label may be determined according to the electronic map, the target electronic shelf label corresponding to a selected target commodity, and the determined position of the mobile terminal, so as to accurately navigate to the target electronic shelf label, to further quickly find the target commodity.

The following statements should be noted:

(1) The accompanying drawings in the embodiment(s) of the present disclosure involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a region may be enlarged or reduced, that is, the accompanying drawings are not drawn according to the actual scale.

(3) In case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims.

The invention claimed is:

1. A navigation system, comprising:
a plurality of first signal sources, each of the plurality of first signal sources being configured to transmit a first wireless signal;
a mobile terminal, configured to receive the first wireless signal, determine a position of the mobile terminal according to the received first wireless signal, and determine a route from the position of the mobile terminal to a target first signal source to perform navigation, according to an electronic map, the received first wireless signal, the position of the mobile terminal, and the target first signal source,
wherein the mobile terminal is further configured to: acquire information of all of the first signal sources which face a camera through the camera of the mobile terminal, after the determining the position of the mobile terminal and before the determining the route; and select a target first signal source according to the information of all of the first signal sources which is acquired.

2. The navigation system according to claim 1, wherein the first wireless signal includes a position information of the first signal source and a power information of the first wireless signal.

3. The navigation system according to claim 2, wherein the first signal source transmits the first wireless signal at a predetermined time interval, and the first wireless signal further includes an ID of the first signal source.

4. The navigation system according to claim 3, wherein the position information of each of the first signal sources $B_i$ in the plurality of first signal sources is denoted by coordinates $(x_i, y_i, z_i)$ of the first signal sources $B_i$ in a preset spatial rectangular coordinate system; where, i is an integer greater than or equal to 1 and less than or equal to I, and I is a total number of the first signal sources corresponding to the first wireless signals received by the mobile terminal;
the mobile terminal is configured to:
determine a distance $R_i$ between the first signal source $B_i$ and the mobile terminal according to a signal strength of the first wireless signal of the first signal source $B_i$ which is received;
determine position coordinates $(x_{01}, y_{01}, z_{01})$ of the mobile terminal in the preset spatial rectangular coordinate system according to the determined distance $R_i$ and the coordinates $(x_i, y_i, z_i)$ of the first signal source $B_i$ by using a formula below:

$$\begin{cases} (x_{01}-x_1)^2+(y_{01}-y_1)^2+(Z_{01}-Z_1)^2=R_1 \\ (x_{01}-x_2)^2+(y_{01}-y_2)^2+(Z_{01}-Z_2)^2=R_2 \\ \quad \ldots \ldots \\ (x_{01}-x_i)^2+(y_{01}-y_i)^2+(Z_{01}-Z_i)^2=R_i \\ \quad \ldots \ldots \\ (x_{01}-x_I)^2+(y_{01}-y_I)^2+(Z_{01}-Z_I)^2=R_I; \end{cases}$$

determine the position of the mobile terminal according to the determined position coordinates $(x_{01}, y_{01}, z_{01})$ and the electronic map.

5. The navigation system according to claim 4, wherein the mobile terminal determines the distance $R_i$ between the first signal source $B_i$ and the mobile terminal by using a formula below:

$$RSSI_i=-[(10n\lg R_i)+A];$$

wherein $RSSI_i$ represents signal strength of the first wireless signal received by the mobile terminal, n represents an environmental parameter, and A represents signal strength received at 1 m from the first signal source.

6. The navigation system according to claim 1, further comprising: at least one second wireless signal source,
wherein the second wireless signal source transmits a second wireless signal,
the mobile terminal further receives the second wireless signal transmitted by the second wireless signal source, determines an initial position of the mobile terminal according to the received second wireless signal; and determines a route from the initial position to a target region to perform navigation, according to the electronic map, the target region including the target first signal source and the determined initial position.

7. The navigation system according to claim 6, wherein the first wireless signal transmitted by the first signal source received by the mobile terminal is: a first wireless signal transmitted by a first signal source located in the target region and within a range of a first preset distance from the mobile terminal.

8. The navigation system according to claim 6, wherein the second wireless signal includes a position information of the second wireless signal source and a power information of the second wireless signal.

9. The navigation system according to claim 6, wherein there are a plurality of second wireless signal sources,
3 second wireless signals among the plurality of second wireless signals received by the mobile terminal are selected, and a position of a second wireless signal source $Y_k$ corresponding to the selected second wireless signal is denoted by coordinates $(x_k, y_k, z_k)$ of the second wireless signal source $Y_k$ in a preset spatial rectangular coordinate system; where, k is an integer greater than or equal to 1 and less than or equal to 3;
the mobile terminal is configured to:
determine a distance $R_k$ between the second wireless signal source $Y_k$ and the mobile terminal, according to received signal strength $RSSI_k$ of the second wireless signal source $Y_k$ by using a formula below:

$$RSSI_k=-[(10n\lg R_k)+A];$$

where, n represents an environmental parameter, and A represents signal strength received at a distance of 1 m from the second wireless signal source;

determine an initial position $(x_{02}, y_{02}, z_{02})$ of the mobile terminal according to the received coordinates $(x_k, y_k, z_k)$ of the second wireless signal source $Y_k$, by using a formula below:

$$\begin{cases} x_{02} = \dfrac{\dfrac{x_1}{R_1+R_2} + \dfrac{x_2}{R_2+R_3} + \dfrac{x_2}{R_3+R_1}}{\dfrac{1}{R_1+R_2} + \dfrac{1}{R_2+R_3} + \dfrac{1}{R_3+R_1}} \\ y_{02} = \dfrac{\dfrac{y_1}{R_1+R_2} + \dfrac{y_2}{R_2+R_3} + \dfrac{y_2}{R_3+R_1}}{\dfrac{1}{R_1+R_2} + \dfrac{1}{R_2+R_3} + \dfrac{1}{R_3+R_1}} \\ z_{02} = \dfrac{\dfrac{z_1}{R_1+R_2} + \dfrac{z_2}{R_2+R_3} + \dfrac{z_2}{R_3+R_1}}{\dfrac{1}{R_1+R_2} + \dfrac{1}{R_2+R_3} + \dfrac{1}{R_3+R_1}}. \end{cases}$$

10. The navigation system according to claim 7, wherein the mobile terminal is configured to display a real-life picture of an environment where the target first signal source is located when being located within a range of a second preset distance from the target first signal source, and the second preset distance range is less than or equal to the first preset distance range.

11. The navigation system according to claim 1, wherein the mobile terminal determines a direction of the mobile terminal according to a geomagnetic sensor and an acceleration sensor; acquires the information of all of the first signal sources which face the camera through the camera, after the camera of the mobile terminal is turned on; and selects the target first signal source according to the information of all of the first signal sources which is acquired.

12. A navigation method of the navigation system according to claim 1, comprising:
    receiving a first wireless signal transmitted by a first signal source;
    determining a position of a mobile terminal according to the received first wireless signal;
    determining a navigation route for navigation according to an electronic map, the received first wireless signal, the position of the mobile terminal, and a target first signal source,
    wherein the first wireless signal includes a position information of the first signal source and a power information of the first wireless signal,
    wherein the determining the position of a mobile terminal includes:
    determining a distance $R_i$ between the first signal source $B_i$ and the mobile terminal according to a signal strength of the first signal source $B_i$ which is received, which includes:
    determining a distance $R_i$ between each of the first signal sources $B_i$ and the mobile terminal by using a formula below;

$RSSI_i = -[(10n\lg R_i) + A]$;

where $RSSI_i$ represents signal strength of the first wireless signal received by the mobile terminal, n represents an environmental parameter, and A represents signal strength received at a distance of 1 m from the first signal source,
    wherein the navigation method further comprises: determining A in the formula, including:
    allowing a distance between the first signal source and the mobile terminal to be 1 m, controlling the first signal source to transmit a signal of a fixed power, acquiring an $RSSI_0$ value of signal strength received by the mobile terminal;
    repeating the above-described step to acquire a plurality of $RSSI_0$ values, acquiring a plurality of $A_0$ values according to a formula $RSSI_0 = -[(10n\lg R_0) + A_0]$;
    calculating an average value of the plurality of $A_0$ values acquired, and determining the average value as the A value.

13. The navigation method according to claim 12, wherein the first signal source transmits the first wireless signal at a predetermined time interval, and the first wireless signal further includes an ID of the first signal source.

14. The navigation method according to claim 13, wherein the position information of the first signal source $B_i$ is denoted by coordinates $(x_i, y_i, z_i)$ of the first signal source $B_i$ in a preset spatial rectangular coordinate system; where, i is an integer greater than or equal to 1 and less than or equal to I, and I is a total number of the first signal sources corresponding to the first wireless signals received by the mobile terminal;
    the determining the position of a mobile terminal includes:
    determining position coordinates $(x_{01}, y_{01}, z_{01})$ of the mobile terminal in the preset spatial rectangular coordinate system according to the determined distance $R_i$ and the coordinates $(x_i, y_i, z_i)$ of the first signal source $B_i$ by using a formula below:

$$\begin{cases} (x_{01}-x_1)^2 + (y_{01}-y_1)^2 + (Z_{01}-Z_1)^2 = R_1 \\ (x_{01}-x_2)^2 + (y_{01}-y_2)^2 + (Z_{01}-Z_2)^2 = R_2 \\ \quad \cdots \cdots \\ (x_{01}-x_i)^2 + (y_{01}-y_i)^2 + (Z_{01}-Z_i)^2 = R_i \\ \quad \cdots \cdots \\ (x_{01}-x_I)^2 + (y_{01}-y_I)^2 + (Z_{01}-Z_I)^2 = R_I; \end{cases}$$

determining the position of the mobile terminal according to the determined position coordinates $(x_{01}, y_{01}, z_{01})$ and the electronic map.

15. The navigation method according to claim 12, further comprising:
    correcting the A value, including:
    allowing the distance between the first signal source and the mobile terminal to be a plurality of test values from 2 m to 10 m, controlling the first signal source to transmit a signal of a fixed power, acquiring an RSSI value of signal strength received by the mobile terminal;
    determining a distance value according to the RSSI value and a formula $RSSI_k = -[(10n\lg R_k) + A]$;
    comparing the distance value obtained by calculating with the test value, and if a difference between the distance value and the test value is greater than 10% of the distance value, executing a step below:
    allowing the distance between the first signal source and the mobile terminal to be 1 m, controlling the first signal source to transmit a signal of a fixed power, acquiring an $RSSI_0$ value of signal strength received by the mobile terminal,
    repeating the above-described step to acquire a plurality of $RSSI_0$ values, acquiring a plurality of $A_0$ values according to a formula $RSSI_0 = -[(10n\lg R_0) + A_0]$;

calculating an average value of the plurality of $A_0$ values obtained; and determining the average value as the A value; and continuing until the difference between the distance value and the test value is less than or equal to 10% of the distance value.

16. The navigation method according to claim 12, further comprising:

displaying a real-life picture of an environment where the target first signal source is located, when navigating to located within a range of a second preset distance from the target first signal source; and navigating to a position where the target first signal source is located according to the displayed real-life picture.

* * * * *